Figure 1:
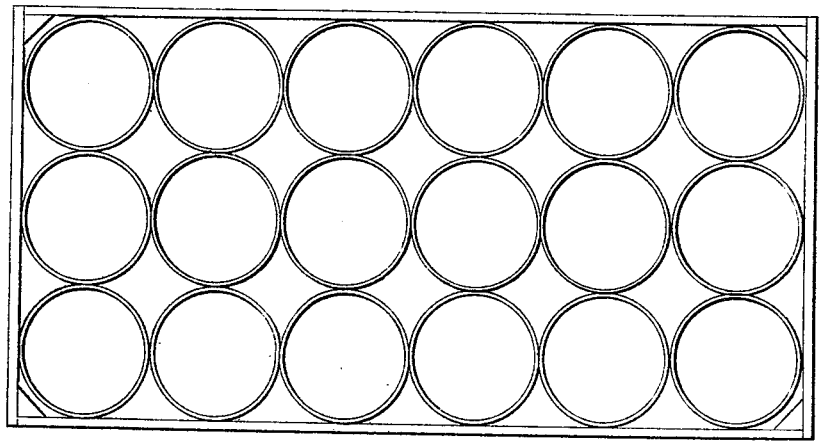
Figure 2:
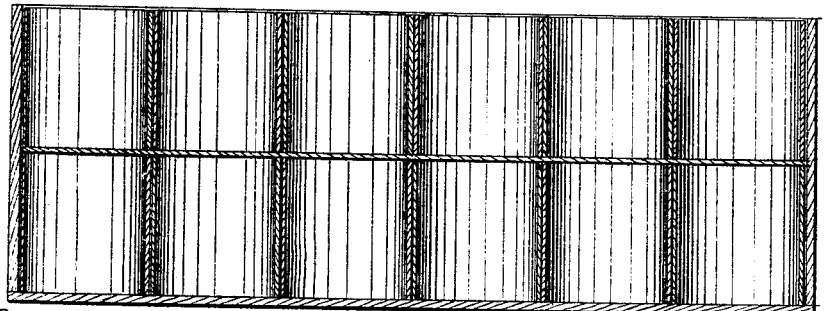

G. D. WILLIS.
EGG-CARRIER.

No. 183,997.

2 Sheets—Sheet 1.

Patented Oct. 31, 1876.

Witnesses
Jervis P. McKay
William A. Hodges

Inventor
George D. Willis

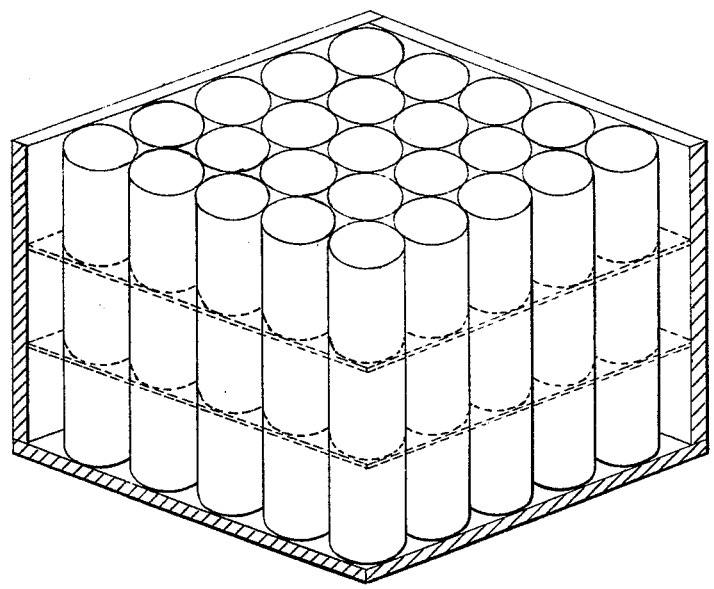

UNITED STATES PATENT OFFICE.

GEORGE D. WILLIS, OF CAVERNA, KENTUCKY.

IMPROVEMENT IN EGG-CARRIERS.

Specification forming part of Letters Patent No. 183,997, dated October 31, 1876; application filed March 31, 1875.

*To all whom it may concern:*

Be it known that I, G. D. WILLIS, of Caverna, Hart county, State of Kentucky, have invented certain Improvement in Egg-Carriers, which improvement is fully set forth in the following specification, reference being had to the accompanying drawings.

My invention relates to a novel method of making egg-carrier cells, as will more fully appear from the following description.

I take sheets of any size of common wrapping-paper, and spread paste made of flour and water upon one entire surface, except a margin equal to the interior circumference of the cell to be formed, which is left clean. A wooden roll is then laid upon said unpasted surface, and one wrap made around said roll, tight enough to temporarily hold the roll against slipping. The rolling is then continued, so that the pasted surface is continuously wrapped around the roll and upon the unpasted surface, so that a tube is thus formed. I then take a series of such tubes, and place them side by side, in any design—that is, within the circumference of a circular, quadrangular, or triangular design—and at the tangential points of contact I glue the said tubes together, thus producing a series of long joined tubes, which I subsequently saw or otherwise cut into proper lengths to receive, in a vertical position, an ordinary-sized egg. These sections of joined tubing are then ready to be packed within any ordinary carrier and filled with eggs, sheets of ordinary pasteboard or thick paper being placed between the abutting ends of the successive sections.

It will be observed that the tubes formed as above described are more soft and pliable than ordinary thick compressed paper, and that the sections are readily lifted out from the carrier and again replaced.

What I claim as new, and desire to secure by Letters Patent, is—

1. The process, herein described, of forming egg-carriers—that is to say, forming from paper a series of long tubes by wrapping layer upon layer with interposed paste, joining the same together at tangential points of contact, and sawing or cutting into sections, substantially as hereinbefore set forth.

2. As a new article of manufacture, an egg-carrier formed of separate tubes or boxes having a continuously-smooth interior surface, said tubes being joined together externally at their tangential points, substantially as hereinbefore set forth.

GEORGE D. WILLIS.

Attest:
ROBERT T. SMITH,
JOHN B. MCKAY.